United States Patent [19]
Semon

[11] 3,787,028
[45] Jan. 22, 1974

[54] ROTARY PLUG VALVE

[76] Inventor: Albert L. Semon, 11 Eliot Pl., Short Hills, N.J. 07078

[22] Filed: Jan. 20, 1972

[21] Appl. No.: 219,219

[52] U.S. Cl. .................................................. 251/317
[51] Int. Cl. ............................................... F16k 5/00
[58] Field of Search ... 251/317, 315, 309, 310, 286; 137/454.5, 454.6

[56] References Cited
UNITED STATES PATENTS

| | | | |
|---|---|---|---|
| 3,223,111 | 12/1965 | Anderson | 251/315 X |
| 3,173,648 | 3/1965 | McGuire et al. | 251/315 X |
| 2,982,148 | 5/1961 | Jackson et al. | 251/286 X |
| 1,015,164 | 1/1912 | Fowden | 251/286 X |
| 2,698,731 | 1/1955 | Koehler et al. | 251/315 X |
| 2,864,579 | 12/1958 | Stoltenberg | 251/309 |
| 3,041,036 | 6/1962 | McFarland, Jr. | 251/315 X |
| 3,531,085 | 9/1970 | Hansen et al. | 251/315 |
| 3,572,383 | 3/1971 | Natalizia | 251/317 X |
| 3,605,792 | 9/1971 | Westbrook | 251/317 X |

FOREIGN PATENTS OR APPLICATIONS

211,621  10/1960  Germany ............................. 251/317

*Primary Examiner*—Samuel Scott

[57] ABSTRACT

A rotary plug valve whose plug chamber includes a sleeve of plastic material compressed in an opening through the valve body between a shoulder on the wall of said opening and a tubular nut screw-threaded in one end of the opening, said sleeve having inlet and outlet port holes and a plug that has transverse fluid passages being rotatably mounted in said chamber with one end in said tubular nut and its other end provided with a knob adjustable thereon which has a stop stud coactive with the ends of an arcuate stop element which is settable in different positions on the valve body to stop the rotation of the plug selectively in different positions.

5 Claims, 8 Drawing Figures

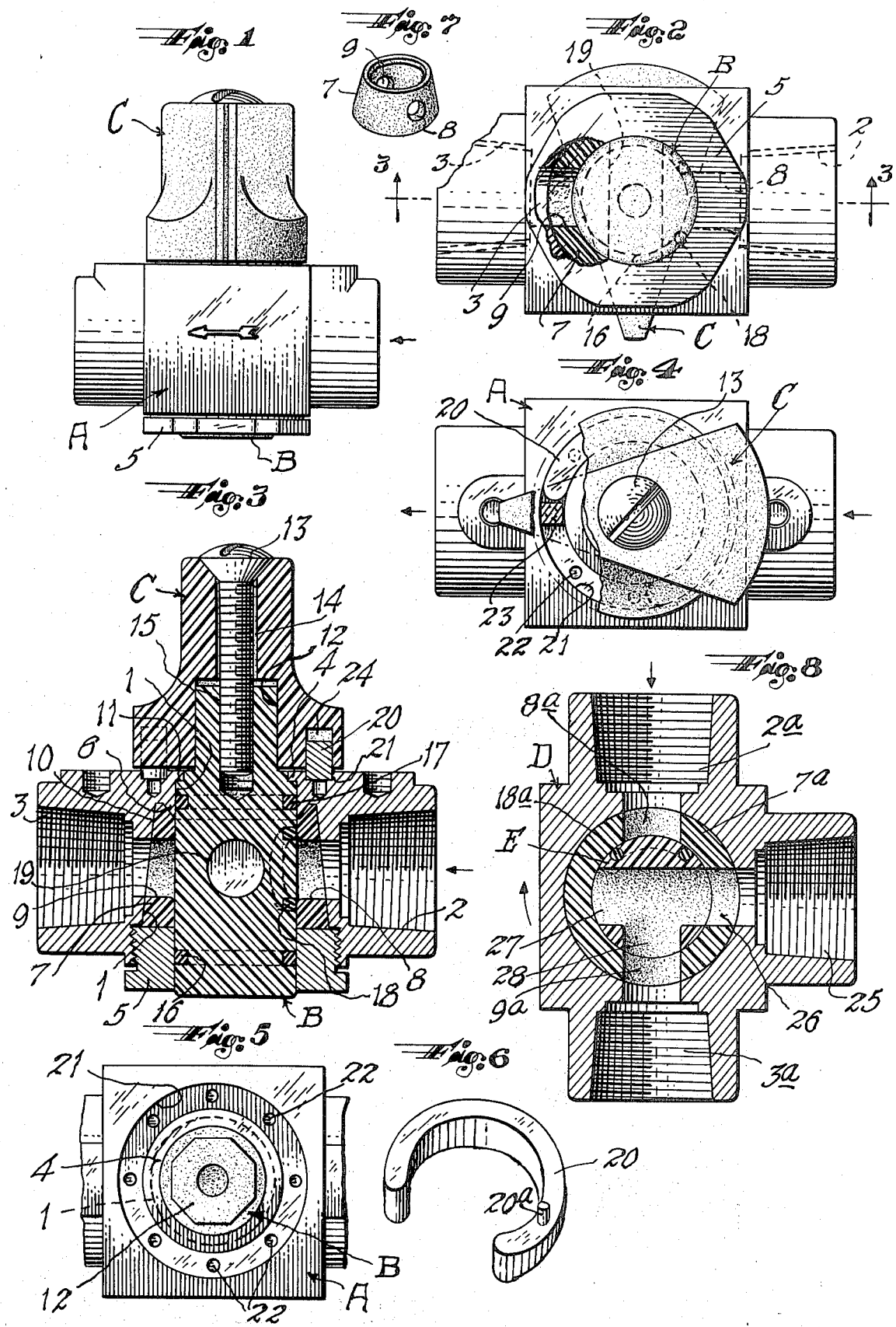

ROTARY PLUG VALVE

BACKGROUND OF THE INVENTION

1. Field of the Invention

This invention relates to valves of the rotary plug type and more particularly concerns the leak-proof mounting of the plug in the valve body and an adjustable means to determine the position of the fluid passage through the plug with respect to the inlet and outlet ports.

2. The Prior Art

Valves having a so-called leak-proof mounting of the rotary plug in a plastic body or with plastic portions or plastic covers in a metal body, are known, for example, in U.S. Pat. Nos. 3,462,119 and 3,467,356.

The mounting of rotary plugs in valve bodies with O-rings to provide so-called leak-proof joints are also known, for example in U.S. Pat. Nos. 2,433,732 and 3,012,753.

The prior art also provides valves having plug stops to limit rotation of the plugs.

However, the prior art valves leave much to be desired in that either they are too complicated and unreliable, or are too expensive, or the contacting surfaces of the plugs and the bodies, or the packing rings, wear too quickly and do not maintain satisfactory leakproof mountings of the plugs in the valve bodies, and the plug stops do not provide in a simple way for stopping of the rotation of the plug selectively in different positions.

SUMMARY OF THE INVENTION

A primary object of the present invention is to provide a rotary plug valve which overcomes the objections to and deficiencies of the prior art valves, and which is simple and relatively inexpensive in construction, reliable and durable in operation and provides novel and improved adjustable means for stopping rotation of the plug selectively in any of a plurality of positions.

The invention especially contemplates a valve which has a metal body with inlet and outlet ports and a plug chamber comprising an opening extending through said body in perpendicular relation to said ports and with an inwardly extending flange at one end, a tubular nut screw-threaded into the valve body at the other end of said opening coaxially therewith, a plastic tubular sleeve in said opening compressed into fluid tight contact with the opening wall between said nut and a shoulder on said wall and having transverse port holes each in alinement with one port, a valve plug rotatably mounted in said chamber having a shoulder adjacent one end abutting said inturned flange and its other end portion rotatable in said tubular nut, and with its intermediate portion in rotatable frictional engagement with the interior surface of said sleeve and also having a transverse passage selectively to move into and out of register with said port holes, packing between said plug, the wall of said opening and said nut, and a knob on the first-mentioned end of said plug.

Other objects of the invention are to provide novel and improved adjustable means for stopping rotation of the plug in any one of a plurality of different positions; and to utilize in such means an arcuate stop-element selectively settable on the valve body in different positions around the axis of the plug, and the knob adjustable coaxially on the plug into different positions having a stop stud to coact with the ends of said arcuate stop element.

A BRIEF DESCRIPTION OF THE DRAWINGS

For a complete understanding of the invention, reference should be had to the following description in conjunction with the accompanying drawing in which:

FIG. 1 is a side elevational view of a two-way valve in its closed position;

FIG. 2 is a bottom plan view thereof, with portions broken away and shown in section;

FIG. 3 is a central vertical sectional view approximately on the axial plane of the line 3—3 of FIG. 2;

FIG. 4 is a top plan view of the valve in open position with portions of the knob broken away to show the plug stop;

FIG. 5 is a top plan view with the knob and the arcuate stop element removed;

FIG. 6 is a perspective view of the arcuate stop element;

FIG. 7 is a perspective view on a reduced scale of the plastic sleeve, and

FIG. 8 is a horizontal sectional view showing the invention embodied in a three-way valve.

DESCRIPTION OF THE PREFERRED EMBODIMENTS

Specifically describing the embodiment of the invention illustrated in FIGS. 1 through 7, the reference character A designates the body or housing of the valve which has a valve chamber therein including an opening 1 extending through the body from which radially extend alined fluid flow ports 2 and 3 which may be respectively an inlet port and an outlet port and may have screw threaded portions or be formed in some other manner for connection of the valve in a pipe line.

At one end of the opening is an inwardly extending perimetral flange 4 while into the other end of the opening is screw-threaded a tubular nut 5. Inwardly of the flange 4, the wall of the opening has an inwardly projecting shoulder 6, and between said shoulder and the inner end of the nut 5 is compressed a plastic sleeve 7, preferably formed of "Teflon." The sleeve has port holes 8 and 9 in register with the respective flow ports 2 and 3.

Preferably, as shown, the exterior surface of the sleeve is frusto-conical, and the opening 1 has a frusto-conical wall portion 10 into fluid contact with which is pressed the outer surface of the sleeve. By tightening nut 5, the fluid tight contact between the sleeve and the frusto-conical wall portion and the plug may be maintained. It is desirable that the inner surface at the small end of the sleeve be beveled or frusto-conical in shape and that the shoulder 6 have a mated frusto-conical surface to facilitate in maintaining a fluid tight contact of the sleeve with the metal body A of the valve. The inner surface of the sleeve is preferably cylindrical and a cylindrical valve plug B, which may be either plastic or metal, is frictionally rotatably mounted in the valve chamber with one end rotatable in the tubular nut 5 and its other end provided with a shoulder 11 abutting the underside of the inwardly projecting flange 4.

The end portion of the plug adjacent to flange 4 projects outwardly from the opening 1 in the valve body and has connected thereto a knob C for rotating the plug. The knob is separably attached to the plug and the plug is held in contact with the flange 4 by a headed screw 13 which extends loosely through an opening 14 in the handle and is screw threaded at 15 in the plug. With this construction it will be seen that when the plug and handle are disconnected from each other, the plug may be pushed into the opening 1 through the nut 5 and into contact with the flange 4, after which the knob can be applied to the projecting portion 12 of the plug.

It is desirable to provide packing such as an O-ring 16 between the plug and the inner surface of the nut 5 and to provide a similar packing 17 between the plug and a portion of the opening 1 between the shoulder 6 and the flange 4. It is also desirable to provide packing such as an O-ring 18 or a disk in the outer surface of the plug to provide a leakproof contact of the plug with the inlet port 2 when the valve is in closed position as shown in FIGS. 2 and 3. The plug has a transverse flow passage 19 to move into and out of alinement with the flow ports for opening and closing the valve, respectively. The valve is shown in closed position in FIGS. 2 and 3 with the ends of the flow passage 19 closed by the walls of the sleeve, and upon rotation of the plug through an angle of 90°, the flow passage 19 is brought into alinement with the flow ports 2 and 3 to open the valve.

The knob C is shown in the valve closing position in FIGS. 1, 2 and 3, and in the valve opening position in FIG. 4. The invention contemplates means for stopping rotation of the plug by the knob in any of a plurality of different positions. In the present embodiment of the invention, this means includes an arcuate stop element 20 seated in a groove 21 in the top of the valve body, and the stop element is settable in the different position by insertion of a pin 20a secured on the stop element into the desired one of a plurality of recesses 22 in the base of the groove 21, so that the ends of the stop element will coact with a stop stud 23 on the knob as best shown in FIG. 4. Preferably the bottom side of the knob has a concentric groove 24 into which the stop element extends as shown in FIG. 3, and the stud 23 is formed in said groove so that the stop stud will coact with the ends of the stop element for limiting rotation of the plug. It is desirable that the extension 12 of the plug be polygonal, for example octagonal in cross-section as shown in FIG. 5 and that the socket 12a in the knob which fits over the extension be correspondingly-shaped so that the knob can be set on the plug in different relations thereto to change selectively the radial relation of the stop stud to the axis of the plug. The distance between the ends of the arcuate stop element is generally sufficient to permit movement of the plug from full-open to full-closed position, and it will be seen that by setting the stop element with its stud 20a in different recesses 22, the rotation of the plug may be stopped in different positions with respect to the flow ports.

While the valve shown in FIGS. 1 through 5 is a two-way valve, the invention may be embodied in a three-way valve as shown in FIG. 8 in which case the valve body D is formed with three angularly related flow ports 2a, 3a and 25 and the sleeve 7a is formed with corresponding port holes 8a, 9a and 26. The plug E is formed with one diametrical flow passage 27 communicating with an angularly related flow passage 28. With this construction, when plug E has been turned to have the flow passage 27 in communication with ports 2a and 3a, plug E has O-ring seal 18a in communication with port 25. When plug E is turned and has O-ring seal in communication with port 2a, the port 3a exhausts into port 25.

I claim:
1. A rotary plug valve comprising:
a valve body having an opening from which radially extend alined flow ports, said opening having an inwardly projecting perimetral flange at one end, an inner annular shoulder intermediate its ends and a tubular nut screw-threaded into its other end, a plastic sleeve compressed into fluid-tight contact with the wall of said opening between said shoulder and said nut and having port holes each in register with one of said flow ports, and a plug extending through said sleeve and said tubular nut in rotatable frictional contact with the inner surface of said sleeve and the inner surface of said nut and the wall of the opening between said inwardly projecting flange and the adjacent end of said sleeve, said plug having a shoulder abutting the underside of said inwardly projecting flange, said plug also having its ends exposed at the ends of said opening and having a transverse passage therethrough selectively movable into and out of register with said flow ports upon rotation of said plug, and a knob mounted on the end of said plug outwardly of said flange in abuttable relation to said body and having a coaxial hole therethrough and a headed screw with its shank passing loosely through said hole and screwed into said plug and its head abutting said knob, with the addition of a stop element adjustably settable in different positions on the valve body beneath said knob and a stop stud on the underside of said knob coactive with said stop element providing for stopping rotation of said plug selectively in any one of a plurality of different positions, said stop element being arcuate and rotatably adjustable on said body coaxially with said knob, and said stop stud being on the bottom side of said knob between and to coact with the ends of said arcuate stop element.

2. A rotary plug valve as defined in claim 1, wherein said valve body has a circular row of spaced recesses concentric with and beneath said plug and said stop element has a pin selectively removably insertable in any of said recesses.

3. A rotary plug valve as defined in claim 1, wherein said knob is adjustably connectible to said plug to change selectively the radial relation of said stop stud to the axis of the plug.

4. A rotary plug valve comprising:
a valve body having an opening from which radially extend alined flow ports, said opening having an inwardly projecting perimetral flange at one end, an inner annular shoulder intermediate its ends and a tubular nut screw-threaded into its other end, a plastic sleeve compressed into fluid-tight contact with the wall of said opening between said shoulder and said nut and having port holes each in register with one of said flow ports, and a plug extending through said sleeve and said tubular nut in rotatable frictional contact with the inner surface of said sleeve and the inner surface of said nut and the wall of the opening between said inwardly projecting flange and the adjacent end of said sleeve, said plug having a shoulder abutting the underside of said inwardly projecting flange, said plug also having its ends exposed at the ends of said opening and having a transverse passage therethrough selectively movable into and out of register with said flow ports upon rotation of said plug, and a knob mounted on the end of said plug outwardly of said flange in abuttable relation to said body and having a coaxial hole therethrough and a headed screw with its shank passing loosely through said hole and screwed into said plug and its head abutting said knob, said shoulder and the interior of the corresponding end of said sleeve having mating frusto-conical surfaces.

5. A rotary plug valve comprising a valve body having an opening from which radially extend alining flow ports, said opening having an inwardly projecting perimetral flange at one end, a plug in rotatable frictional contact with the inner surface of said opening and having a shoulder abutting the underside of said inwardly projecting flange, said plug also having an end exposed at one end of said opening and having a transverse passage therethrough selectively movable into and out of register with said flow ports upon rotation of said plug, a knob mounted on the end of said plug outwardly of said flange in abuttable relation to said body and having a coaxial hole therethrough and a headed screw with its shank passing loosely through said hole and screwed into said plug and its head abutting said knob, said knob having a concentric groove in its bottom side, an arcuate stop element rotatably adjustable on the top side of said body coaxial with and overlaid by said knob and extending into said groove, said body having a circular row of spaced recesses on its top side concentric with and overlaid by the knob and said stop element having a pin selectively removably insertable in any of said recesses, said knob having a stud on the bottom side thereof to coact with the ends of said arcuate stop element providing for stopping rotation of said plug selectively of any one of a plurality of different positions.

* * * * *